United States Patent Office 3,505,012
Patented Apr. 7, 1970

3,505,012
PROCESS FOR MAKING BRUSHITE FORM OF CALCIUM HYDROGEN PHOSPHATE
Ernest A. Dale, Hamilton, Keith H. Butler, Marblehead, and Martha J. B. Thomas, Winchester, Mass., assignors to Sylvania Electric Products Inc., a corporation of Delaware
Continuation-in-part of application Ser. No. 517,261, Dec. 29, 1965. This application Apr. 11, 1968, Ser. No. 730,970
Int. Cl. C01b 25/32; C01c 1/16
U.S. Cl. 23—109     8 Claims

ABSTRACT OF THE DISCLOSURE

A strong mineral acid is mixed with separate solutions of either diammonium phosphate or a soluble calcium salt or both solutions. The solutions are then admixed and the pH is maintained below about 3.8 and substantially only the brushite form of calcium hydrogen phosphate is precipitated.

CROSS REFERENCES TO RELATED APPLICATIONS

This application is a continuation-in-part of our co-pending application, Ser. No. 517,261, filed Dec. 29, 1965 and entitled "Process For Making Brushite," now abandoned.

This invention relates to the preparation of $$CaHPO_4 \cdot 2H_2O$$

commonly called by the mineral name brushite, for use in the production of luminescent materials. Many such luminescent materials are made by mixing $CaHPO_4$ with other raw materials, such as $CaCO_3$, $CaCl_2$, $CaF_2$ and with activating compounds. The mixing is followed by firing under carefully controlled conditions to obtain luminescent materials of the highest possible efficiency.

Obtaining high efficiency in luminescent materials is dependent on the purity, reactivity, particle size and chemical composition of the various raw materials. In most phosphorus which employ $CaHPO_4$ as a raw material, the quantity used is more than 50% of the total weight, so that control of its composition and other physical characteristics are vitally important. In particular, a variation in stoichiometry, which is the ratio of calcium to phosphorus, of less than 1% may reduce the brightness of the final phosphor substantially.

The customary method of preparing $CaHPO_4$, or its hydrated analog $CaHPO_4 \cdot 2H_2O$, is to add a solution containing the phosphate ion to a solution containing the calcium ion. The materials commonly used for making these solutions are $(NH_4)_2HPO_4$ and $CaCl_2$. These materials are readily soluble in water and trace impurities, such as heavy metals are readily removed to give highly purified solutions. The addition of $(NH_4)_2HPO_4$ solution to the $CaCl_2$ solution is usually continued until the pH rises to 5.0, or slightly higher.

An alternate method of preparation is to add the solution containing the phosphate ion to the chloride ion solution until the pH drops to about 5.0–4.5. Both methods have been used for the preparation of calcium phosphate and depending on the temperature of precipitation, either brushite or monetite is obtained. At temperatures below 79° C., the hydrated compound, brushite, is usually obtained and this is frequently converted to the anhydrous $CaHPO_4$, monetite, by heating the slurry after precipitation is complete. We have found that either of the two methods of precipitation described above gives a product which is somewhat variable in purity, physical characteristics and stoichiometry.

According to our invention, we have discovered that a solution containing $(NH_4)_2HPO_4$ should be added to a calcium salt solution, such as solutions of $CaCl_2$, $Ca(NO_3)_2$ and/or $Ca(C_3H_3O_2)_2$, so that the final solution during the precipitation of $CaHPO_4 \cdot 2H_2O$ is maintained in the acid range, particularly below a pH of 3.8. Preferably the pH of the $(NH_4)_2HPO_4$ is kept below 7 by adding phosphoric acid while the pH of the soluble calcium salt is kept below about 2 by adding a strong mineral acid, such as HCl or $HNO_3$, which will not react with any of the components of the mixture to form an insoluble precipitate. Generally, the solutions which are mixed should be substantially stoichiometric to form $CaHPO_4$, that is, within reasonable tolerances. Reasonable tolerances usually can be considered as up to 10 mole percent excess of either ingredient.

Moreover, we have found that the variability of the material produced can be substantially reduced by employing a method in which the two solutions are formed into droplet sizes of less than 100 microns and intimately mixed by simultaneously spraying the solutions into one another and allowing the individual droplets to react. In addition, we have found it is to be essential to control accurately not only the concentrations of the two solutions, but also their pH before mixing as well as the pH of the resultant slurry. The degree of atomization of the solutions in the spraying operation is quite important.

The chemical reaction leading to the formation of brushite follows the Equation 1:

$$(NH_4)_2HPO_4 + Ca^{2+} + 2H_2O \rightarrow CaHPO_4 \cdot 2H_2O + 2NH_4^{1+} \quad (1)$$

There are, however, a number of other competing reactions possible during the mixing of these solutions which may lead to the precipitation of hydroxyapatite, hydrated tricalcium phosphate, octa-calcium phosphate, or possibly monocalcium phosphate, although the solubility of this latter material under these conditions is extremely high. These reactions (using $CaCl_2$ as an example of the soluble chloride) as given by Equations 2, 3, 4 and 5 respectively.

$$3(NH_4)_2HPO_4 + 5CaCl_2 + H_2O \rightarrow \\ Ca_5OH(PO_4)_3 + 6NH_4Cl + 4HCl \quad (2)$$
$$2(NH_4)_2HPO_4 + 3CaCl_2 + XH_2O \rightarrow \\ Ca_3(PO_4)_2 \cdot XH_2O + 4NH_4Cl + 2HCl \quad (3)$$
$$6(NH_4)_2HPO_4 + 8CaCl_2 + 6H_2O \rightarrow \\ Ca_8H_2(PO_4)_6 \cdot 6H_2O + 12NH_4Cl + 4HCl \quad (4)$$
$$2NH_4H_2PO_4 + CaCl_2 + H_2O \rightarrow \\ Ca(H_2PO_4)_2 \cdot H_2O + 2NH_4Cl \quad (5)$$

Since it is not known which of these competing reactions may occur in any single case, it will be shown that an impurity can and does occur in certain conditions of precipitation. This can be demonstrated by certain special tests applied to the product.

An object of the invention is the preparation of brushite of high purity and reproducible composition for use in the preparation of phosphors.

A further object is the preparation of brushite which is controlled in particle size and reactivity.

Another object is to produce brushite which can be readily converted to $CaHPO_4$, commonly called by the mineral name monetite, by heat treatment.

A still further object is to produce a material which will give luminescent materials of the highest possible brightness.

The many other objects, features and advantages of our invention will become manifest to those conversant with the art upon reading the following specification when taken in conjunction with the accompanying drawings in which preferred embodiments of our invention are shown and described by way of illustrative graphs.

Figure 1:
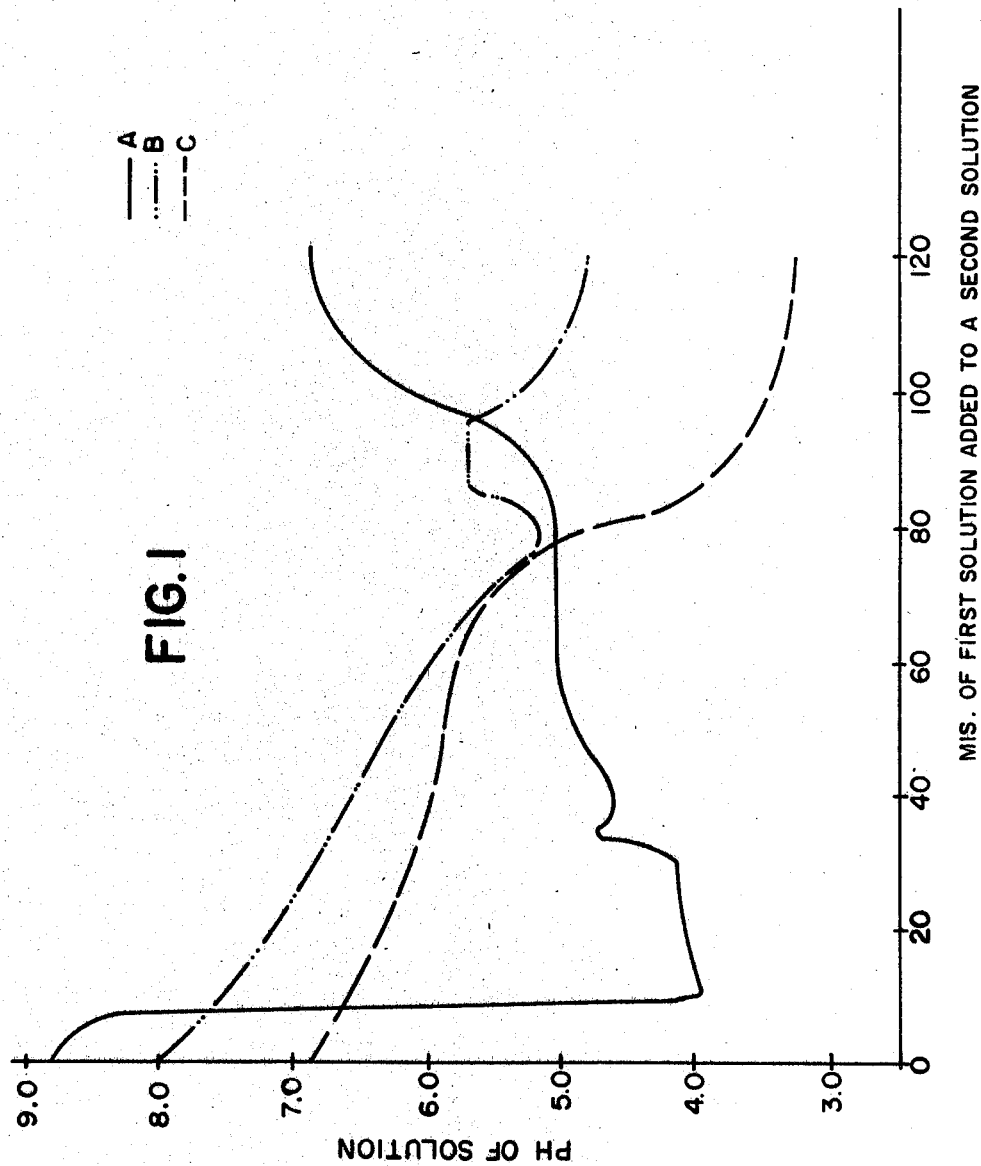
FIGURE 1 is a series of curves showing the effect upon pH of various methods of mixing $(NH_4)_2HPO_4$ and $CaCl_2$.

In FIGURE 1, curve A shows the variation of pH when a solution of $(NH_4)_2HPO_4$ having a pH of 8.0 and a concentration of 1.2 moles/liter is added slowly to a solution of $CaCl_2$ having a pH of 8.8 and a concentration of 1.2 moles/liter. Curve B of FIGURE 1 shows the variation of pH when the same $CaCl_2$ solution is added to the same $(NH_4)_2HPO_4$ solution. Curve C of FIGURE 1 shows the variation of pH when $CaCl_2$ solution having a pH of 1.4 and a concentration of 1.2 moles/liter is added to a $(NH_4)_2HPO_4$ solution having a pH of 6.8 and a concentration of 1.2 moles/liter. The $CaCl_2$ solution was prepared by dissolving $CaCl_2$ in water and adding HCl solution until the desired pH was reached. The

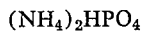
$(NH_4)_2HPO_4$ solution was prepared by dissolving $(NH_4)_2HPO_4$ crystals in water and then adding phosphoric acid until the desired pH was reached.

It is significant in Curve A, FIGURE 1 that the pH of the slurry drops rapidly as the $(NH_4)_2HPO_4$ solution is added. This drop can only result from the occurrence of one of the competing reactions (2), (3), or (4) described above, each of which liberate free acid. Hence, it can be hypothesized that hydroxyapatite, for example, may be formed in the early stage of the precipitation. Since this is an extremely insoluble compound, it is though to remain in the slurry and thus contaminate the brushite and change the ratio of calcium to phosphorus in the final product. The reason for this tendency to precipitate hydroxyapatite lies in the ionization of the phosphate. When a water soluble phosphate, such as $(NH_4)_2HPO_4$ is dissolved, the ions present include $NH_4^{+1}$, $H_2PO_4^{-1}$, $HPO_4^{-2}$, and $PO_4^{-3}$. In very concentrated solutions there is a tendency for $H_2PO_4^{-1}$ to predominate, while in very dilute solutions $PO_4^{-3}$ is the predominant ion species. At intermediate concentrations $HPO_4^{-2}$, the desired species, is predominant. The pH of the solution also has a considerable effect with low pH favoring the formation of either $$HPO_4^{-2}, \text{ or } H_2PO_4^{-1}$$

Thus with a small addition of $(NH_4)_2HPO_4$ solution there is rapid ionization to give $PO_4^{-3}$ ions which then react with the high concentration of $Ca^{+2}$ ions resulting in the formation of hydroxyapatite.

In Curve B, FIGURE 1, the jelling of the solution when the number of moles of $CaCl_2$ added is nearly equal to the number of moles of $(NH_4)_2HPO_4$ can be explained as the precipitation of a nearly colloidal material. As we approach the equivalent point, the amount of phosphate in the solution diminishes to a point where $PO_4^{-3}$ begins to form in substantial amounts and conditions thus become favorable for the formation of hydroxyapatite-type materials, even though the concentration of calcium is rather low.

In Curve C, FIGURE 1, the use of a solution containing some $H_3PO_4$ in addition of $(NH_4)_2HPO_4$ makes the pH lower than Curve B for equal increments of $CaCl_2$ added and there is no indication of jelling. This is due to the suppression of the ionization of $HPO_4^{-2}$ to $PO_4^{-3}$ by the lower pH. As a result, the concentration of $PO_4^{-3}$ never is sufficiently high to allow precipitation of hydroxyapatite.

The following examples present two conventional methods for preparation of $CaHPO_4$ (Examples I and II) and one embodiment of our method (Examples III, IV, V and VI).

EXAMPLE I

To a liter of 1.2 M $CaCl_2$ solution pH 8.7 add slowly while stirring a liter of 1.2 $(NH_4)_2HPO_4$ solution pH 7.9. The resulting slurry is filtered to remove the precipitate which is washed free of chloride by deionized water. The precipitate is then air dried at room temperature.

EXAMPLE II

To a liter of 1.2 M $(NH_4)_2HPO_4$ solution pH 7.9 add slowly while stirring a liter of 1.2 M $CaCl_2$ solution pH 8.7. The resulting slurry is filtered to remove the precipitate which is washed free of chloride by deionized water. The precipitate is then air dried at room temperature.

EXAMPLE III

To a liter of 1.2 M $(NH_4)_2HPO_4$ solution at a pH of 6.85 add slowly while stirring a liter of 1.2 M $CaCl_2$ at a pH of 1.4 pH. The resulting slurry is filtered to remove the precipitate which is then washed free of chloride by deionized water. The precipitate is air dried at room temperature.

EXAMPLE IV

To a liter of 1.2 M $Ca(NO_3)_2$ solution at a pH of 1.4, add slowly, while stirring, a liter of 1.2 molar

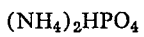
$(NH_4)_2HPO_4$ solution at a pH of 6.85. The resultant slurry is filtered to remove the precipitate which is then washed free of nitrate ions with deionized water. The precipitate of brushite is air dried at room temperature.

EXAMPLE V

To a liter of 1.2 molar $Ca(C_3H_3O_2)_2$ solution at a pH of 1.4, add slowly, while stirring, a liter of 1.2 molar

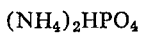
$(NH_4)_2HPO_4$ solution at a pH of 6.85. The resultant slurry is filtered to remove the precipitate which is then washed free of acetate ions with deionized water. The precipitate of brushite is air dried at room temperature.

Examination by X-ray powder diffraction and by infrared absorption of the materials produced by these examples show no significant differences and hence they would usually be considered identical. We have found, however, that they do not behave identically in lamp performance and that differences can be found by differential thermal analyses which we believe to represent differences in stoichiometry due to the presence of impurity phase or phases which are the result of one or more of the competing reactions shown in Equations 2 to 5.

Figure 2:
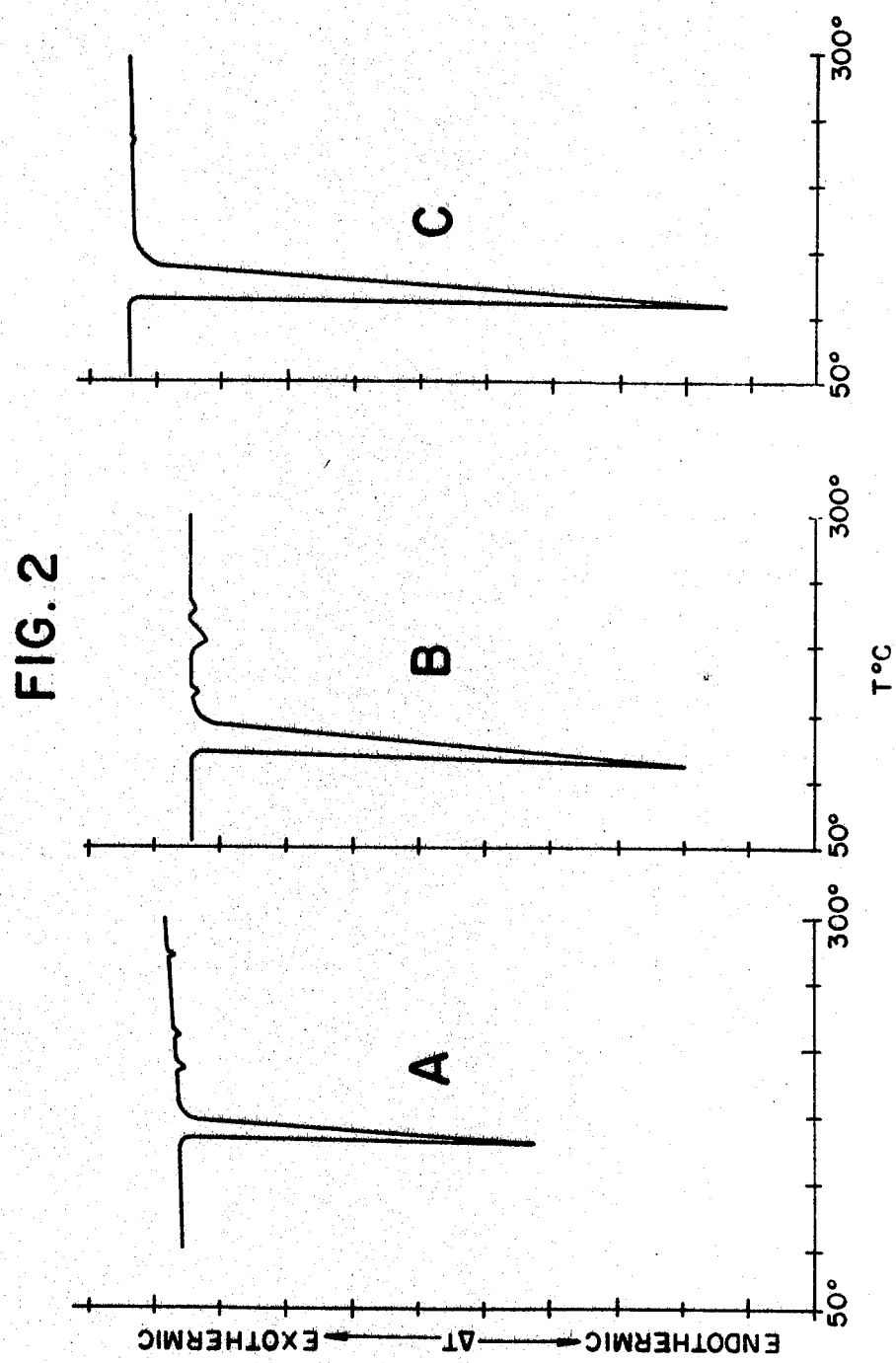
FIGURE 2 is a series of differential thermograms of $CaHPO_4 \cdot 2H_2O$ produced by Examples I, II and III following, showing impurities (non-brushite components) in the $CaHPO_4 \cdot 2H_2O$.

FIGURE 2 represents the differential thermograms of Exampes I, II and III. Any type of a blip beyond the major endotherm around 100° must be recognized as an impurty phase. Obviously, the material of Example III has but a single minor (if any) impurity phase. The material of Example II (Curve B) indicates a possible multiplicity of impurity phase or phases possibly as many as three, one of which seems to be of significant proportion and the material of Example I (Curve A) could have as many as four minor impurity phases.

As additional proof as to the cause of this improved material, samples of the product produced at various stages of the precipitation were taken and analyzed on the differential thermal analyzer.

Figure 3:
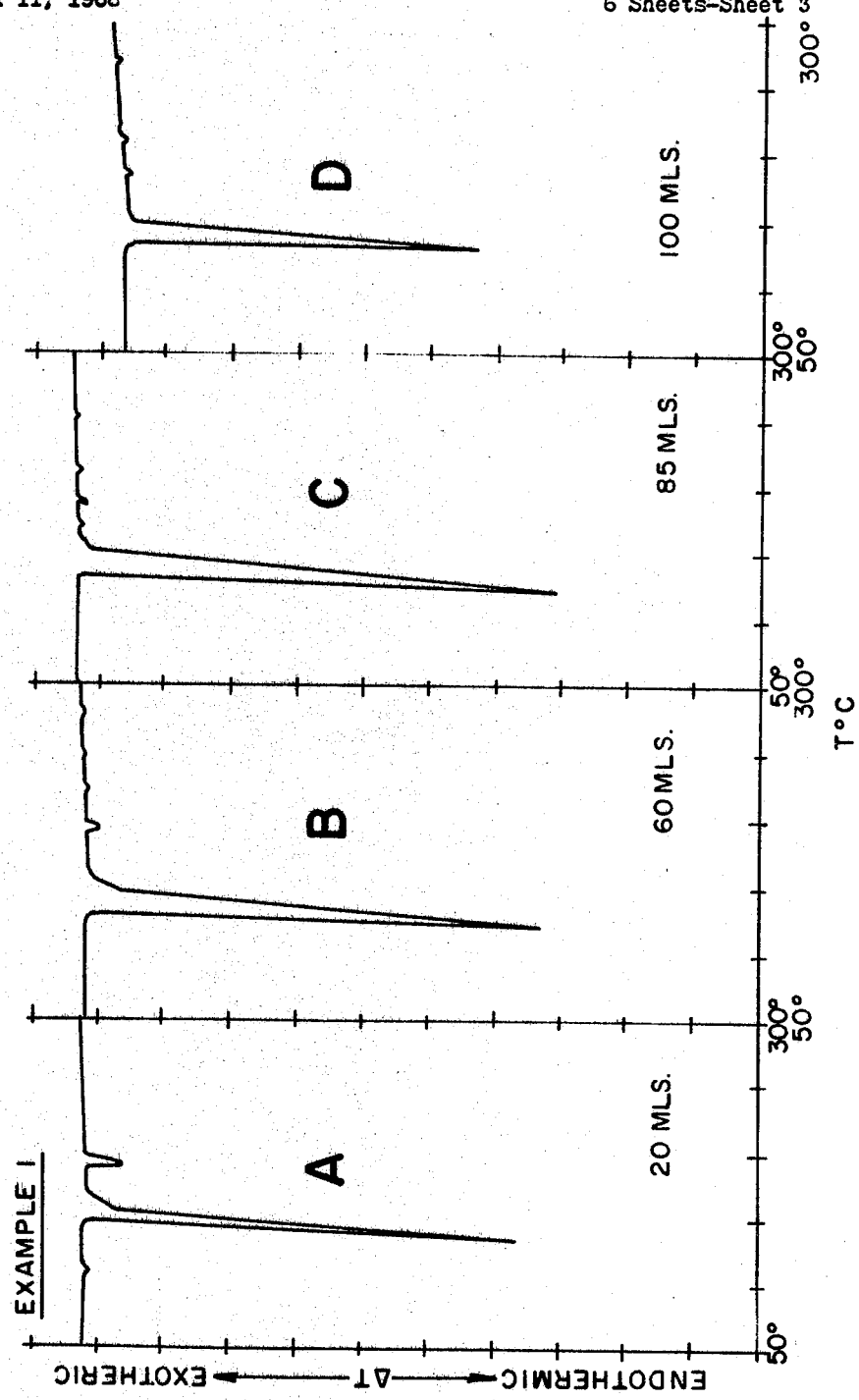
FIGURES 3, 4 and 5 are differential thermal analysis thermograms of intermediate products produced during precipitation of the brushite by the method disclosed in Examples I, II and III respectively when samples are taken after varying amounts of solutions have been mixed.
Figure 4:
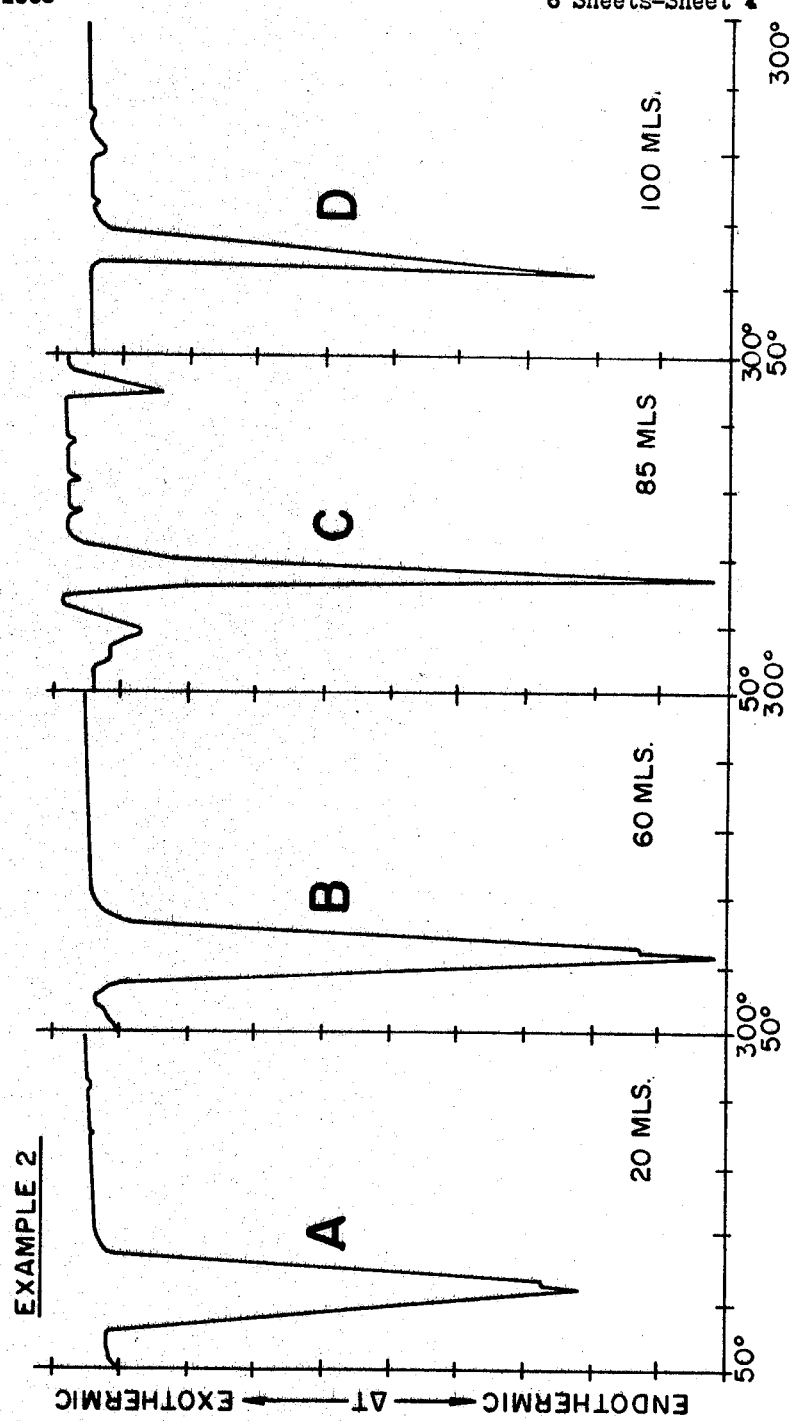
Figure 5:
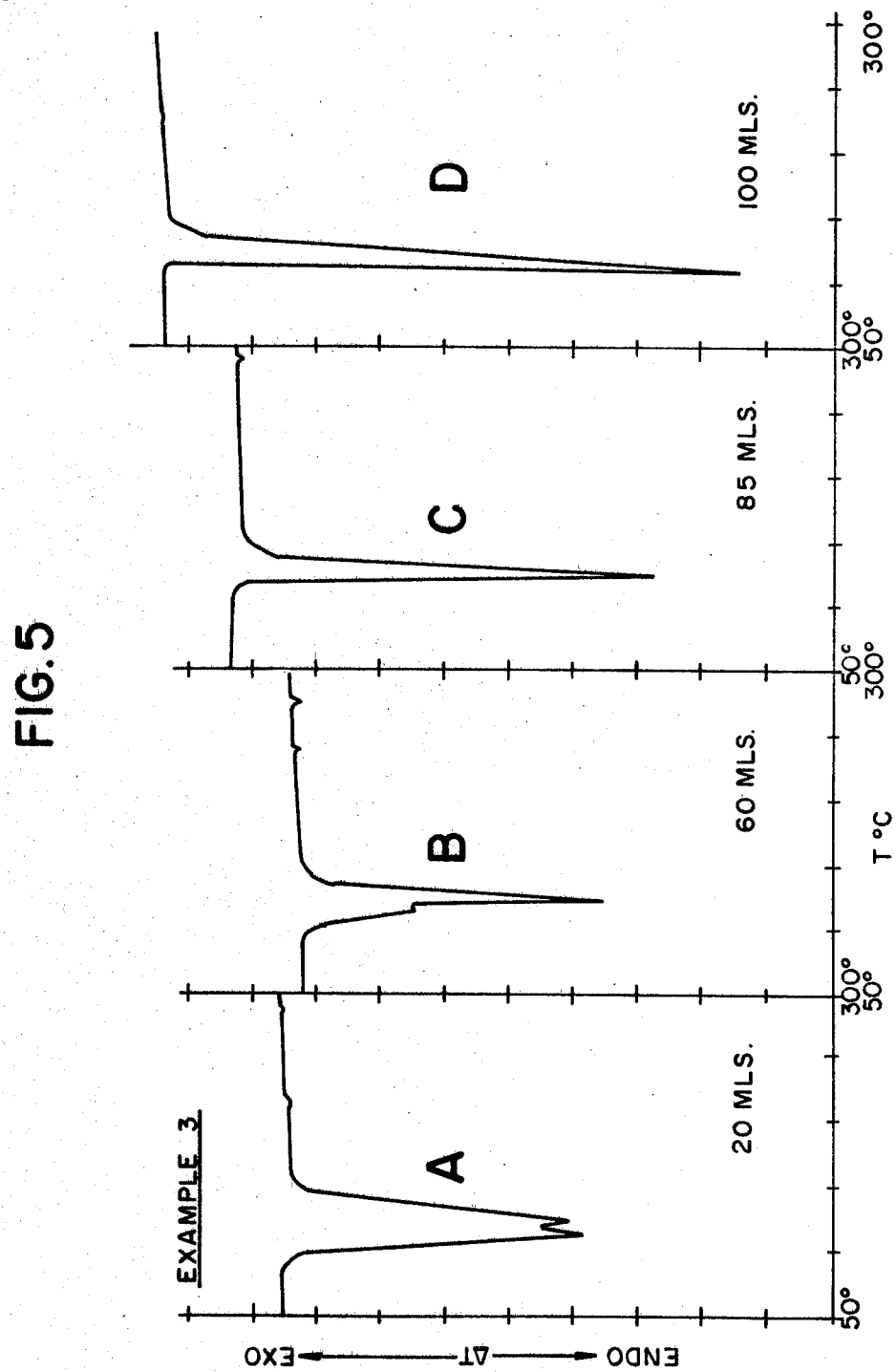

From FIGURES 3 and 4 of the drawing, it will be seen that significant impurity phases exist in the $$CaHPO_4 \cdot 2H_2O$$

produced by the prior art methods described in Examples I and II of this application. These impurity phases are evidenced by the blips which occur on the curve of the differential thermal analysis thermogram. Only in FIGURE 5, which is a curve illustrating the product of Example III, do these blips disappear. In section D which illustrates the end of the reaction, there is no significant blip on the curve. Hence, no significant nonbrushite contaminant phases occur in the product.

While the use of acidified solutions of $(NH_4)_2HPO_4$ and $Ca^{2+}$ in a batch precipitation in which $Ca^{2+}$ solution is added gradually to a solution of $(NH_4)_2HPO_4$ until the pH is lowered to predetermined value, gives a product substantially better for the preparation of luminescent materials and constitutes one embodiment of our invention, we have found that still further improvements in reproducibility of composition and in limited range of particle size can be attained by novel methods of mixing the solutions.

During the course of a batch precipitation, the ratio of unreacted phosphate to unreacted calcium is constantly changing. This results in a change in the rate of reaction and consequently a change in particle size. In addition, the precipitated material may absorb some of the phosphate ions which are present in high concentration during the early stage. Also, with most methods of mixing there is a local concentration gradient at the point where the stream of soluble Ca salt solution enters the larger volume of slurry containing unreacted $(NH_4)_2HPO_4$.

Thus, in addition to the critical nature of the pH with respect to the stoichiometric characteristics, the method of mixing also has been found in this invention to be highly important. In order to achieve a highly reproducible material, it was found necessary to achieve a system whereby fine droplets of equimolar concentrations were caused to react together. Ideally, the smallest droplet, or the greatest degree of atomization must be achieved. We have found that the reaction of intimately mixed fogs of high purity solutions of 1.2 M $Ca^{2+}$ and 1.2 M $$(NH_4)_2HPO_4$$

achieved a reproducibility, with respect to differential thermal analysis, physical characteristics, and stoichiometry which never has been achieved before. No significant impurity phases show.

Table I gives a summary of the reproducibility of the method.

TABLE I

CaHPO₄·2H₂O

| Brushite Test | Particle size (microns) | Bulk density (gm./in.³) |
|---|---|---|
| A | 4.7 | 2.7 |
| B | 4.0 | 2.6 |
| C | 4.5 | 2.6 |
| D | 4.8 | 3.0 |
| E | 4.4 | 2.7 |
| F | 4.6 | 3.1 |

These data all fall nearly within the experimental error of the various methods. The various brushite samples were made on different days from different solutions.

Additional proof as to the important nature of the mixing using the optimum pH range, as described above, is shown in the following tests. Using the same reactant solutions and a constant precipitation pH of 3.5, $$CaHPO_4 \cdot 2H_2O$$

was prepared using three different methods of mixing (1) the preferred method of atomization, (2) one of the reactants ($CaCl_2$) was sprayed at a lower pressure (i.e., larger droplet size) than is used in the preferred method, (3) no atomization of the reactant mixtures, i.e., two streams were made to flow into the reactant kettle simultaneously with agitation. In all cases $CaHPO_4 \cdot 2H_2O$ was produced. These characteristics are listed in the following Table II.

TABLE II.—BRUSHITE CHARACTERISTICS

| Test | Atomizing nozzle pressure | | pH | Particle size | Bulk density | Chemical Ca/P ratio |
|---|---|---|---|---|---|---|
| | CaCl₂ | (NH₄)₂HPO₄ | | | | |
| (1) | 70 | 45 | 3.5 | 6.3 | 3.8 | .938 |
| (2) | 70 | 14 | 3.7 | 3.7 | 2.4 | .917 |
| (3) | 0 | 0 | 3.5–3.9 | 6.3 | 4.2 | .932 |

The calcium hydrogen phosphate in each case was then filtered and reslurried with water, at a concentration of 1.33 lbs. gallon. HCl was added so that a pH of between 3.46 and 3.55 was maintained. The slurry was heated to between 95–97° C. to convert $CaHPO_4 \cdot 2H_2O$ to $CaHPO_4$. The following are the characteristics of the $CaHPO_4$ formed.

| Test | Loss in ignition | Ca/P | Particle size | Bulk density |
|---|---|---|---|---|
| 1 | 7.30 | .947 | 4.7 | 5.2 |
| 2 | 7.57 | .974 | 3.5 | 4.4 |
| 3 | 7.49 | .961 | 5.4 | 5.3 |

Since the three products were found to have different Ca/P ratios by chemical analyses, this was compensated for by blend adjustment in the phosphor formulation. Thus, all three phosphor blends were identical with respect to the number of moles of Ca and P, as well as all other constituents. However, the reactivity of the Ca/P materials could not be compensated for. The lamp results are as follows:

| Test No. | P.W. | Density | Lumens 100 hrs. | Lamp color (visual) |
|---|---|---|---|---|
| A | 5.5 | 78.4 | 3,123 | Correct. |
| B | 6.3 | 78.7 | 3,240 | Greenish. |
| C | 6.7 | 78.2 | 3,229 | Do. |

Although B and C look excellent with respect to lumens, their color as indicated by the x–y values were sufficiently green to preclude their use as a Cool White phosphor without the loss of well over 100 lumens.

The above experiment proves definitively that not only the amount of calcium and phosphorus must be known for color and brightness optimization of the phosphor, but the reactivity of the species must be controlled. Past experiments indicate that the dramatic shift in color is the result of insufficient calcium entering into the lattice of the final luminescent product. Even though the calcium was present in the blends, it was not sufficiently reactive.

Figure 6:
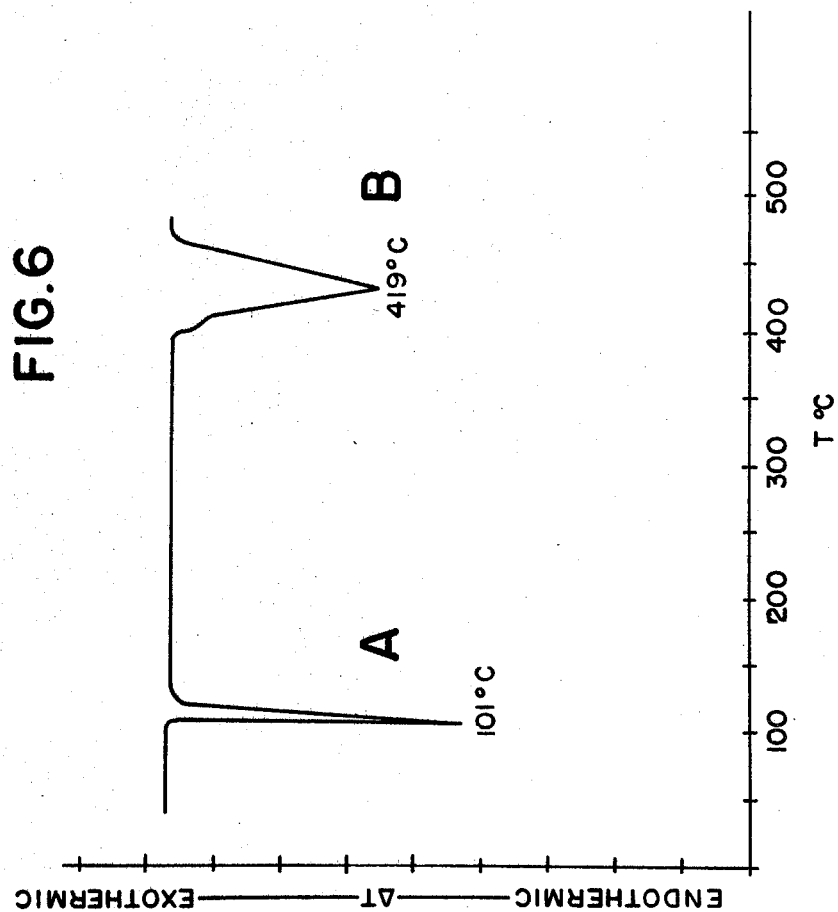
FIGURE 6 is a differential thermal analysis thermograms of $CaHPO_4 \cdot 2H_2O$ produced by spray precipitation.

In FIGURE 6, the purity of the brushite which is produced is illustrated. The differential thermal analysis thermogram indicates the first reaction took place at 101° C. which was the conversion of brushite $$(CaHPO_4 \cdot 2H_2O)$$

to monetite ($CaHPO_4$). A second reaction took place at 419° C. which was the conversion of monetite to γ calcium pyrophosphate ($Ca_2P_2O_7$). No other endotherms took place during the test, thus indicating the extremely high purity of the spray precipitated brushite.

It is apparent that modifications and changes may be

As our invention, we claim:

1. In a process for making the brushite form of calcium hydrogen phosphate, the steps which comprise: admixing a strong mineral acid with either a solution of diammonium phosphate or a solution of divalent calcium ions or with both solutions, admixing together said solutions of diammonium phosphate and divalent calcium ions and maintaining the pH of the admixed solutions below about 3.8 for a time sufficient to precipitate substantially only the brushite form of calcium hydrogen phosphate.

2. The process according to claim 1 wherein the calcium ion solution has a pH below about 3.8.

3. The process according to claim 1 wherein the admixture of diammonium hydrogen phosphate and calcium ions are substantially stoichiometric relative to each other.

4. The process according to claim 1 wherein the soluble calcium ions are formed from calcium chloride.

5. A process for making the brushite form of calcium hydrogen phosphate, the steps which comprise: spraying a solution of diammonium hydrogen phosphate into a sprayed solution of divalent calcium ions, at least one of said solutions being acidified with a strong mineral acid, and the admixture being maintained at a pH below about 3.8, whereby substantially only the brushite form of calcium hydrogen phosphate will form, allowing the droplets to fall and collecting said brushite.

6. The process according to claim 5 wherein the calcium ion solution has a pH below about 3.8.

7. The process according to claim 5 wherein the average droplet size of each stream is below about 100 microns.

8. The process according to claim 5 wherein the solutions of diammonium hydrogen phosphate and calcium ions are substantially stoichiometric with respect to each other after impingement.

References Cited
UNITED STATES PATENTS 3,095,269   6/1963   Chiola et al. _____ 23—109

OSCAR R. VERTIZ, Primary Examiner

H. S. MILLER, Assistant Examiner

U.S Cl. X.R.

23—100; 252—301.4